J. E. HALE.
CUSHION TIRE FOR VEHICLE WHEELS.
APPLICATION FILED FEB. 12, 1916.
1,255,876.
Patented Feb. 12, 1918.
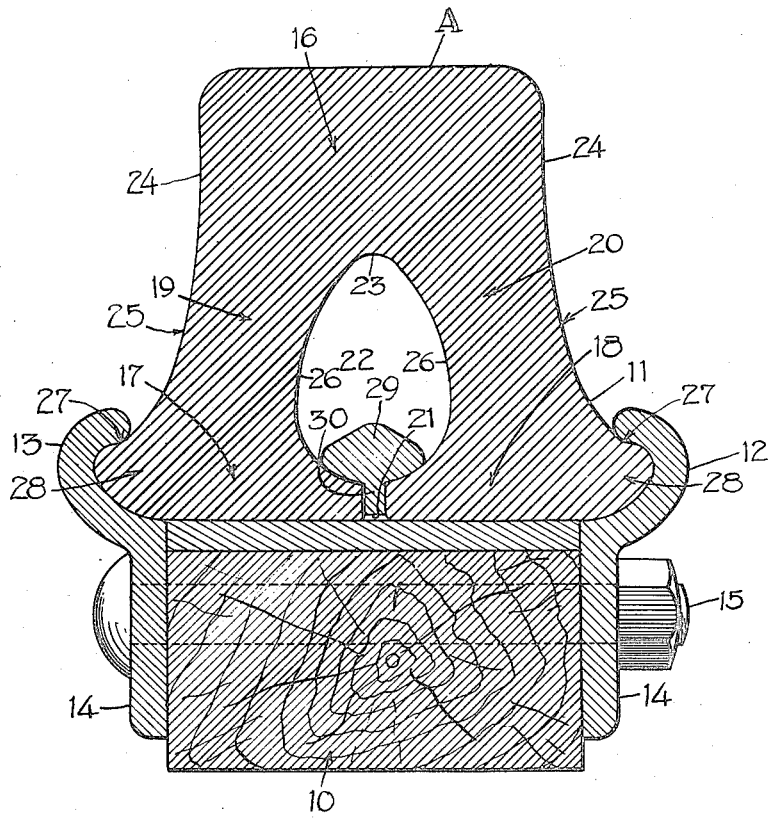
James E. Hale, Inventor.
By C. L. Landow.
Attorney

UNITED STATES PATENT OFFICE.

JAMES ELLIS HALE, OF AKRON, OHIO.

CUSHION-TIRE FOR VEHICLE-WHEELS.

1,255,876.   Specification of Letters Patent.   Patented Feb. 12, 1918.

Application filed February 12, 1916. Serial No. 78,033.

*To all whom it may concern:*

Be it known that I, JAMES E. HALE, a citizen of the United States, residing at Akron, in the county of Summit and State of Ohio, have invented new and useful Improvements in Cushion-Tires for Vehicle-Wheels, of which the following is a specification.

The present invention relates broadly to vehicle tires but has more particular reference to cushion tires adapted especially for use on motor trucks and similar vehicles.

A satisfactory and efficient cushion tire must embody the following attributes: It must be capable of readily yielding to increased load along lines radial with respect to the vehicle wheel; it must present a long arc of contact to the road surface; it must have a strong tough tread capable of resisting, without cutting or tearing the rough and uneven spots in a road surface; it must have a base which is broad, bulky and relatively unelastic to permit fastening devices to be properly engaged for securing the tire to the wheel, and finally the intermediate portion lying between the base and tread portions should be weakened, to permit of ready distortion along lines radial with respect to the wheel, and should be of the greatest possible depth in order that a maximum cushioning effect may be obtained.

It is also requisite that the base of the tire be of such configuration that it may be readily applied, without employment of special fastening devices, to a standard S. A. E. motor vehicle wheel, having conventionl fastening devices, and that the coring undercutting, or other method adopted for weakening the intermediate portion of the tire, be done in such manner that the continual distortion of the rubber stock will not result in chafing or the development of cracks, creases, or tears, at those points whereat the stock is weakened.

It is, therefore, one of the principal objects of the present invention to provide a cushion tire, wherein the base is relatively broad and thick, and of a configuration to permit secure attachment of the tire, without the use of specially constructed fastening devices, to a standard motor vehicle wheel having conventional tire fastening devices; wherein the tread portion is of relatively tough material and of considerable thickness or bulk; and wherein the weakening of the tire between the tread and base portions is accomplished by the formation of an internal channel or chamber, which is of such cross sectional outline and so related to the side faces of the tire that it will weaken the tire only between the tread and base portions and without reducing the bulk of the tread and base portions and will enable the tire to withstand repeated radial and lateral distortion without an attendant formation of cracks, creases or the like.

Another object is to so design the tire that the spaced side walls or intermediate portions, which support the tread, are of such configuration that they may be of a maximum depth and minimum thickness to insure a superior cushioning capacity and may, at the same time, be capable of effectively withstanding the lateral and radial thrusts to which they are subjected.

The above and other incidental objects of a similar nature, which will hereinafter be more specifically treated, are preferably accomplished by such means as are illustrated in the accompanying drawings described in the following specifications, and then more particularly pointed out in the claims which are appended hereto and form a part of this application.

In the accompanying drawing, wherein there has been illustrated a preferred embodiment of the invention as it is reduced to practice, the figure is a transverse section taken through the tire and a standard motor vehicle wheel, upon which the tire is adapted to be secured.

My improved tire as shown in the accompanying drawing is applied to an S. A. E. standard motor vehicle wheel, which embodies a felly 10; a felly band 11; a pair of clencher side flanges 12 and 13, having annular attaching portions 14, which engage against opposite faces of the felly; and attaching bolts 15, which are passed transversely through the felly and attaching portions for securing the clencher side flanges to the felly.

The tire, generally designated by the letter A, is here shown as including a tread portion 16; a pair of separated base portions 17 and 18 and intermediate tread supporting walls 19 and 20, which connect the base and tread portions.

The base portions are separated by an annular channel 21, which is formed in the inner face of the tire during the manufacture thereof, while the intermediate tread supporting walls 19 and 20 are separated by an annular channel 22, which as herein shown may be most aptly described as being substantially egg shaped. The apex of this channel 22 is located adjacent to the tread of the tire as indicated at 23.

The side faces of the tread are, as indicated at 24, approximately parallel, in the embodiment of the tire herein shown, while the outer faces of the tread supporting side walls 19 and 20 are curved, or dished inwardly, as indicated at 25, and in a direction opposite to the curvature of the inner faces 26 of the side walls, which define the side portions of the egg shaped channel. The curved surfaces 25 merge gradually into the approximately parallel side faces 24 of the tread and also merge by a curved surface as at 27 into the flanged portions 28, which are formed on the outer edge of each of the base members 17 and 18 for engagement by the clencher side flanges 12 and 13.

This feature of oppositely curving the inner and outer faces of the two tread supporting side walls is one of considerable importance in the present tire, since it makes possible the weakening of the side walls to a maximum extent at their approximate central portion and produces a gradual thickening of the side walls in each direction from from the center so that the junctions of the side walls with the relatively stiff base and tread portions are substantial and of sufficient strength to withstand without cracking, creasing, tearing or the like, the strains and stresses incident to distortion.

Obviously the tire, which cushions effectively, must of necessity provide for greater distortion than a non-cushioning tire, and since the intensity of stress in the distorted rubber is approximately proportionate to the magnitude of the distortion, very careful consideration must be given to the construction of the tire, so that in no portion of the tire shall the intensity of stress resulting from distortion, localize along any line or restricted area in such manner as to form creases or folds. This desired object is accomplished in the present invention since the particular construction of the side walls above set forth, provides for the gradual reduction of the intensity of stress as the lines of distortion merge into the base and tread portions. Apparently by the present construction, the intensity of stress gradually increases from a minimum in the tread to a maximum in the cushioning portions (the tread supporting side walls) and then diminishes to a minimum in the base portion.

In this connection it is pointed out that the tendency of the tire to develop cracks, creases and tears would naturally be most marked at the apex of the channel and at the junction of the channel walls with the base portions.

Thus, by the present construction, the distortion of the rubber will in effect be concentrated at those portions whereat distortion will have the least tendency to assault the integrity of the tire.

Another important advantage is obtained by shaping the weakening channel 22 to give it a cross section similar to the longitudinal section of an egg. All sharp angles are eliminated and the liability of the formation of cracks, creases and tears thereby materially reduced. Furthermore, this particular shaping of the channel 22 makes it possible, to reduce to a minimum the amount of rubber required in building up the inner sides of the base portions, and to place the apex of the channel a maximum distance from the tread surface, so that the tread is of maximum thickness and will, therefore, give relatively large mileage in service.

In order to prevent the base portions from moving toward each other with a consequent releasing of the ribs from proper engagement with the clencher side flanges, I employ a floating ring 29, which is disposed within the chamber 21 and is provided with an inwardly extending annular web 30. This web is disposed between the adjacent edges of the base portions and as shown serves to separate them at all times. In this connection it is to be explained that the combined normal widths of the base portions are such that the base members must be transversely compressed when the tire is applied to the wheel. Consequently the tendency of the base portions to resume their normal widths through expansion, acts as an agent for insuring the tires against accidental displacement from the wheel.

It will be observed that the inner edges of the separated base flanges 17 and 18 are much thinner than their clencher edges 28, which results in the disposition of the cavity 22 in the tire cross-section in such manner that a tread portion of maximum depth, as well as an increased compressibility of the side walls 19 and 20, is afforded as desired by this invention.

In the claims, I have employed the terms "plane of apex of the channel" and "outer plane of confinement of the base member." By the first of these terms, namely, "plane of apex of the channel," I mean to designate the circumferential zone which includes those transverse elements of the tire which pass through the apex of the channel and in parallelism to the tread face of the tire.

By the term "outer plane of confinement of the base member," I mean to designate the circumferential zone which includes those transverse elements which connect the circular lines defining the outermost points of engagement of the ring 29 and the flanges 12 and 13 with the base members. The term "outer" is, of course, used in relation to the hub of the wheel.

What I claim is:

1. A cushion tire including a tread portion, spaced side walls supporting the tread portion the center planes of which walls converge toward the tread, and base members supporting the side walls, each of said side walls having its inner and outer faces oppositely curved whereby each side wall has a zone of minimum thickness at its approximate center and whereby the side walls gradually increase in thickness from the minimum at the approximate center to maximum at its junctions with the tread and base members.

2. A cushion tire including a tread portion, spaced side walls supporting the tread portion, bases supporting the side walls and defining in conjunction therewith a channel which extends circumferentially through the tire, each of said side walls having a zone of minimum thickness which zone is located opposite the approximate center of the channel and approximately midway between the plane of the apex of the channel and the outer plane of confinement of the base of the side wall.

3. A cushion tire including a relatively thick tread portion, spaced side walls supporting the tread portion and base members supporting the side walls, said side walls having their inner and outer faces oppositely curved whereby a zone of minimum thickness occurs at the approximate center of each side wall, said zone of minimum thickness in each side wall being also located approximately midway between the plane of the apex of the channel and the outer plane of confinement of the base thereof.

JAMES ELLIS HALE.